United States Patent [19]

Johnson et al.

[11] 3,967,382
[45] July 6, 1976

[54] PLENUM CHAMBER LENGTH MEASUREMENT SYSTEM FOR NUCLEAR FUEL

[75] Inventors: Keith O. Johnson; Fredrick M. Coffman, both of Richland, Wash.

[73] Assignee: Exxon Nuclear Company, Inc., Bellevue, Wash.

[22] Filed: Jan. 10, 1975

[21] Appl. No.: 540,152

[52] U.S. Cl. ............................ 33/125 R; 33/174 L; 176/19 R
[51] Int. Cl.² ........................................... G01B 7/14
[58] Field of Search ......... 33/125 R, 174 L, DIG. 5; 176/19, 19 LD; 324/71

[56] References Cited
UNITED STATES PATENTS

| | | | |
|---|---|---|---|
| 2,969,674 | 1/1961 | Ogle | 176/19 R X |
| 3,813,286 | 5/1974 | Goldman et al. | 176/19 R |

*Primary Examiner*—Richard E. Aegerter
*Assistant Examiner*—Charles E. Phillips
*Attorney, Agent, or Firm*—F. Donald Paris

[57] ABSTRACT

A system for the measurement of the length of the plenum chamber in a nuclear fuel rod, both before and after service in the nuclear reactor. The system basically comprises inserting the fuel rod into a casing having an eddy current sensing coil therein and advancing it until the coil output provides a signal indicative of the end of the plenum spring being centrally located within the coil. At an end of the casing is provided a plenum chamber length transducer of the displacement type, such as a linear variable differential transformer, which contacts the adjacent end cap of the fuel rod and when the coil provides an appropriate readout corresponding to proper location of the plenum spring end produces an output signal which is indicative of the length of the plenum chamber.

12 Claims, 8 Drawing Figures

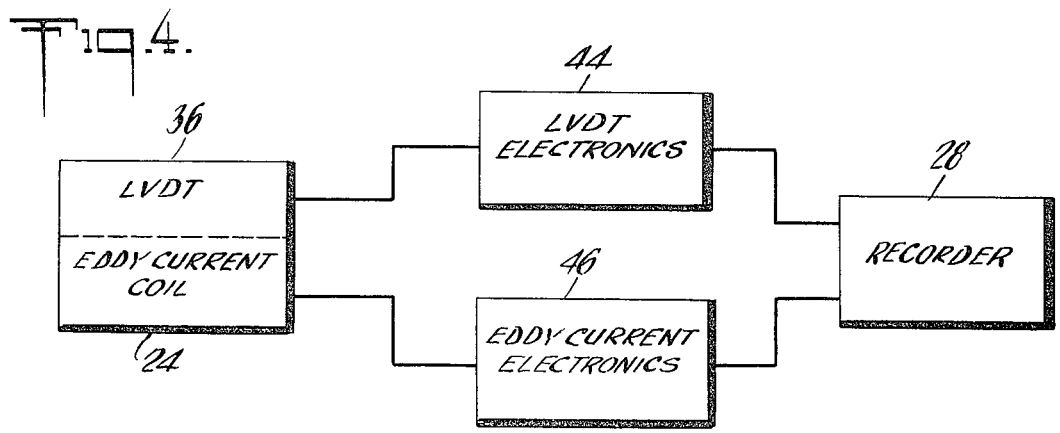
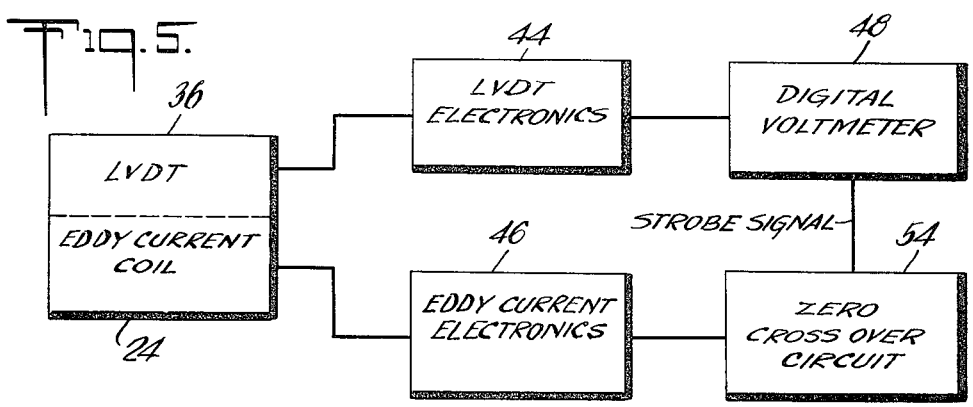
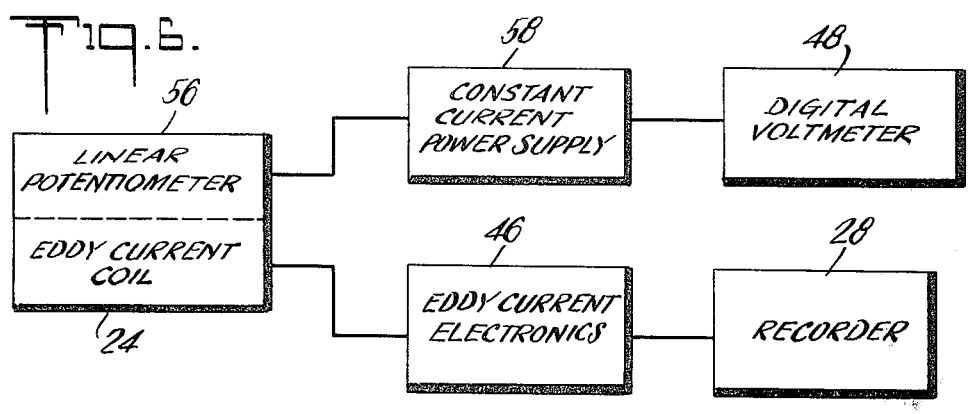
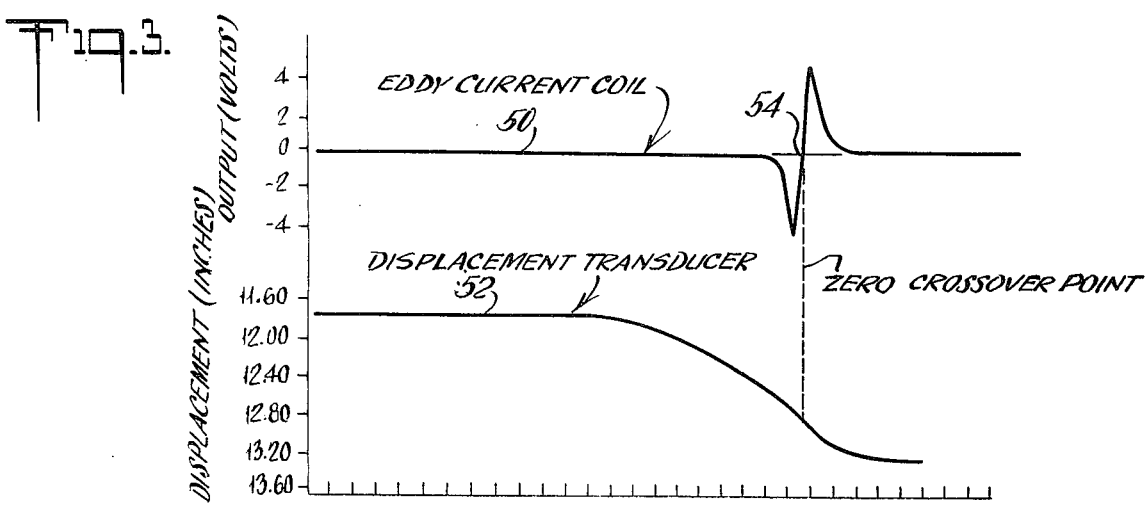

PLENUM CHAMBER LENGTH MEASUREMENT SYSTEM FOR NUCLEAR FUEL

BACKGROUND OF THE INVENTION

In the use of nuclear fuel, it is important to know the measurement of the length of a fuel column, that is the end-to-end length of the fuel inside each nuclear fuel rod, both before and after service of the fuel rod in a nuclear reactor. Such knowledge will enable verification that the fuel column length in the assembled fuel rod complies with established product specifications and also provides insight into the expected as well as actual performance of the fuel during service in the nuclear reactor. By knowing the before and after service length of the fuel column in the rod, the foregoing information on performance will be ascertainable.

The final fuel column length is equivalent to the overall length of the fuel rod which may be measured manually by means of a micrometer gauge, minus the sum total of the plenum chamber length and the upper and lower end cap lengths. The end cap lengths are known and can readily be obtained from the fabrication specifications, thus leaving only the plenum chamber length as an unknown.

Present techniques used to determine the plenum chamber length of the fuel rod during a pre-service inspection of the fuel rod include taking an X-ray of the upper portion of the fuel rod. The use of the X-ray measurement technique is not readily adaptable for use in the inspection basin required for post-service rod measurements and, accordingly, there is a need for a fast, accurate and reliable measurement technique for determining the plenum chamber length both for pre-service and post-service fuel rods.

SUMMARY OF THE INVENTION

The present invention overcomes the deficiencies of the prior art by providing a measurement system for measuring the plenum chamber length of a nuclear fuel rod both before and after service in a nuclear reactor, and which is readily adaptable for remote use in an inspection basin, and also is capable of use for other closed system level measurements wherein the level interface is detectable by means of an external transducer. Basically, according to the present invention, the plenum chamber length is measured by first inserting the nuclear fuel rod into a transducer casing or housing including an eddy current coil which has been energized and advancing the rod until the coil provides a signal which is indicative that the end of the plenum spring is centrally located within the coil, referred to herein as the zero crossover point. As the fuel rod is advanced, the end of the top end cap of the fuel rod comes into contact with a displacement transducer, such as a linear variable differential transformer (LVDT) which has a plunger extending therefrom into the casing for contact with the top end cap. As the plunger is depressed by the movement of the rod, the transducer's output changes accordingly and can be read when the eddy current coil is positioned at the zero crossover point, thereby providing an indication of the length of the plenum chamber.

Other objects and features of the present invention will be enumerated and apparent from the following specification with reference to the attached drawings which, by way of example, disclose a preferred embodiment for the subject invention.

BRIEF DESCRIPTION OF THE DRAWINGS

FIG. 3 illustrates a readout obtained when using a plenum chamber length measurement system according to the present invention;

FIG. 4 illustrates a block diagram of a preferred embodiment of the electronics of the present invention;

FIG. 5 illustrates a block diagram of another embodiment of the electronics of the present invention;

FIG. 6 illustrates a block diagram of a further embodiment of the electronics of the present invention;

DESCRIPTION OF THE PREFERRED EMBODIMENT

Figure 1:
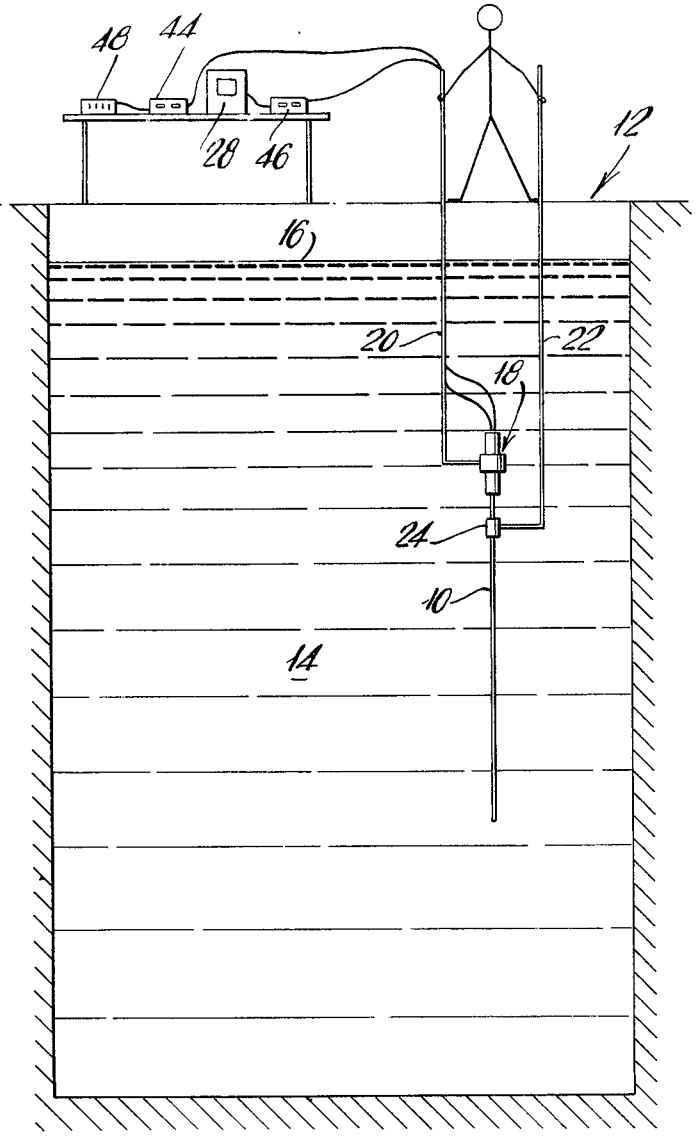
FIG. 1 is a schematic illustration of the plenum chamber length transducer system in operation for a post-service fuel rod in accordance with the present invention.
Figure 2:
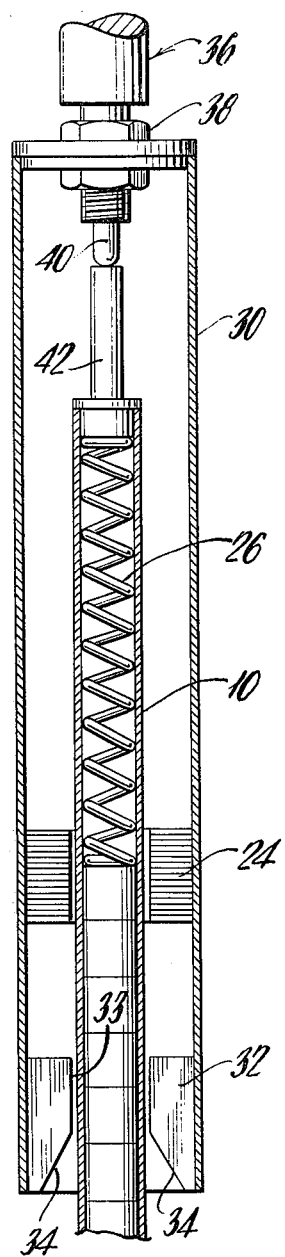
FIG. 2 is an enlarged illustration of the plenum chamber length transducer according to the present invention.

Referring now to the drawings wherein like reference numerals are used throughout the several views herein to designate similar parts, there is shown in FIG. 1 a fuel rod plenum chamber length determination system in accordance with the present invention when used for a post-service fuel rod. As illustrated, a fuel rod 10 which has been in service in a reactor is disposed within an inspection basin 12 for purposes of having its plenum chamber length determined. Basically, the inspection basin, as is well known in the art, comprises a pool of water 14 at a level 16, the depth of which may vary but preferably is approximately 25 to 30 feet deep. The water is used for radiological shielding of the radioactive fuel rods after they have been in service in the nuclear fuel reactor. As discussed below, it will be seen that such a basin is not employed for those rods prior to their placement into service. Typically, for safety reasons, the top of the fuel rod should not be bought closer than 6 feet from the surface of the water after the rod has been in service in the reactor. The plenum chamber length transducer generally designated 18 is mounted on a suitable transducer holding tool designated 20 which for purposes of this invention will suffice provided that it is sufficiently long and strong enough to permit lowering of the transducer into the inspection basin and manipulation thereof and also can accommodate the necessary wiring for connection of the transducer to its associated electronics to be discussed hereinafter. At the same time, the fuel rod is held in place within the inspection basin by means of a fuel rod handling tool 22 which is designed to have a grasping end 24 which surrounds the fuel rod and facilitates manipulation thereof within the basin. While the preferred embodiment comprises a manually operable system, it is also possible to employ remote control operation as discussed hereinafter. Once the fuel rod is held in the basin by means of the tool 22, the plenum chamber length transducer 18 then is lowered over the upper end of the fuel rod 10. The transducer 18 is lowered until an eddy current coil 24 (see FIG. 2) is positioned over the bottom end of the usual plenum spring 26 which has a first end in contact with the fuel column and a second end in contact with one end of said fuel rod within the fuel rod, as determined from the signal produced by the coil which is displayed on a suitable recorder such as a strip chart recorder 28. The transducer 18 comprises a transducer tubular or cylindrical casing 30 wherein the coil 24 is mounted by means of set screws through the casing 30 and also has located as shown below the coil a suitable centrally open cylindrical guide 32 for purposes of facilitating advancement of the fuel rod 10 within the casing 30 through the central passageway 33. The guide is provided with inward sloping undersides 34 to facilitate guiding the advancement of the rod. At the top of the casing, there is mounted a suitable transducer 36 which is sensitive to displacement of a plunger 40 operably associated therewith. In FIG. 2 of the preferred embodiment, the transducer comprises a linear variable differential transformer (LVDT) which is secured in place to the top of the casing 30 by means of a lock nut 38 and has protruding into the casing the spring-biased plunger 40. As shown, the plunger 40 is in a depressed position in contact with the top end cap 42 of the fuel rod 10. Internally, the LVDT's internal plunger rod 40 will be displaced causing an appropriate output signal to be provided. The LVDT is designed to measure the distance from the uppermost end of the top end cap 42 to the distant end of the plenum spring 26. When the plunger 40 is fully extended into the casing 30, the output signal from the LVDT is directly proportional to (or a direct readout of) the distance between the center of the eddy current coil 24 and the bottom of the plunger 40. The LVDT basically comprises an insulated core on which is wound a primary coil and two secondary coils. Secondary coils are located on opposite sides of the primary coil differentially connected, that is grounded at their centers. The plunger rod has a high value of magnetic permeability and as it moves within the coil it varies the mutual inductance of each secondary coil to the primary accordingly. The LVDT as shown is connected to suitable electronics 44 which supplies an alternating voltage to the primary, and as the rod is moved within the LVDT coil, the magnitude of voltage coupled to the secondary coils is changed. The electronics, which is essentially conventional, rectifies and amplifies the difference signal of the two secondary coils, thus providing an output voltage which is proportional to the displacement of the internal rod. As used in the present invention, the rod is spring loaded and is displaced when it comes into contact with the top end cap of the fuel rod as the rod is inserted into and moves upward in the plenum chamber length transducer housing. While the LVDT and the eddy current coil are mounted in the same housing in order to maintain their respective physical locations for conveniently making the plenum chamber length measurement, there is no electrical interaction between the two transducers and the outputs from each are conditioned and processed independently. The eddy current coil is connected to suitable electronics 46 which process the output signal from the coil. As the plunger 40 is depressed, the output signal indicates an increase in length between the center of coil 24 and the bottom of the plunger 40. By subtracting the known length of the top end cap 42 from this measurement the length of the plenum chamber readily can be determined.

While there has been disclosed the use of a LVDT for the displacement transducer, it should be recognized that various other types of displacement transducers can be used with the present system, such as a linear potentiometer or a variable reluctance displacement transducer. When a linear potentiometer or variable reluctance transducer is used, the basic mounting of the transducers to the casing 30 would be the same.

As previously disclosed, after the rods are in service and when either the reactor is shutdown for routine maintenance and/or reloading, the fuel bundle assemblies are transferred to the inspection basin and individual fuel rods are removed from the assembly as required for measurement and inspection. As illustrated in FIG. 4, the block diagram schematically illustrates the LVDT 36 connected through its electronics 44 to an appropriate recorder 28 and the eddy current coil 24 connected through its electronics 46 also to the recorder 28. The recorder is suitable for producing the recording as shown in FIG. 3. The recorder is a commercially available product, as is the LVDT which, together with its associated electronics, can be obtained from Schaevitz Engineering of Pennsauken, New Jersey and identified as Model PCA-117-500 and the eddy current coil and its electronics can be obtained from Zetec, Inc. of Issaquah, Wash., and identified as Model 2000-0.450.

FIG. 3 shows the coil output voltage signal 50 and the output signal 52 from the transducer 36, both of which are a function of time and rod movement in the casing 30. As previously discussed, when the end of the plenum spring 26 is centered within the coil 24, there is provided an end of plenum spring signal 54 from the coil 24 which is identified as the zero crossover point in FIG. 3, as shown in the upper trace 50. The output trace from the LVDT 36 as the fuel rod is advanced is shown in the lower trace of FIG. 3 and as shown by drawing a vertical line down from the zero crossover point produced by the eddy current coil 24, the plenum chamber length readout point can readily be determined. By calibrating the output of the LVDT in terms of inches or the like, the actual length of the plenum chamber can readily be determined as described herein. At the intersection of the vertical zero crossover line with the transducer trace 52, a reading can be taken along the vertical coordinate (displacement in inches between about 12 and 13 inches) of the bottom trace. For the example shown, the distance from the top end cap to the bottom of the plenum spring was 12.89 inches and since the length of the top end cap is readily known from the specifications, it merely need be subtracted from the readout to obtain the plenum chamber length.

Figure 7:
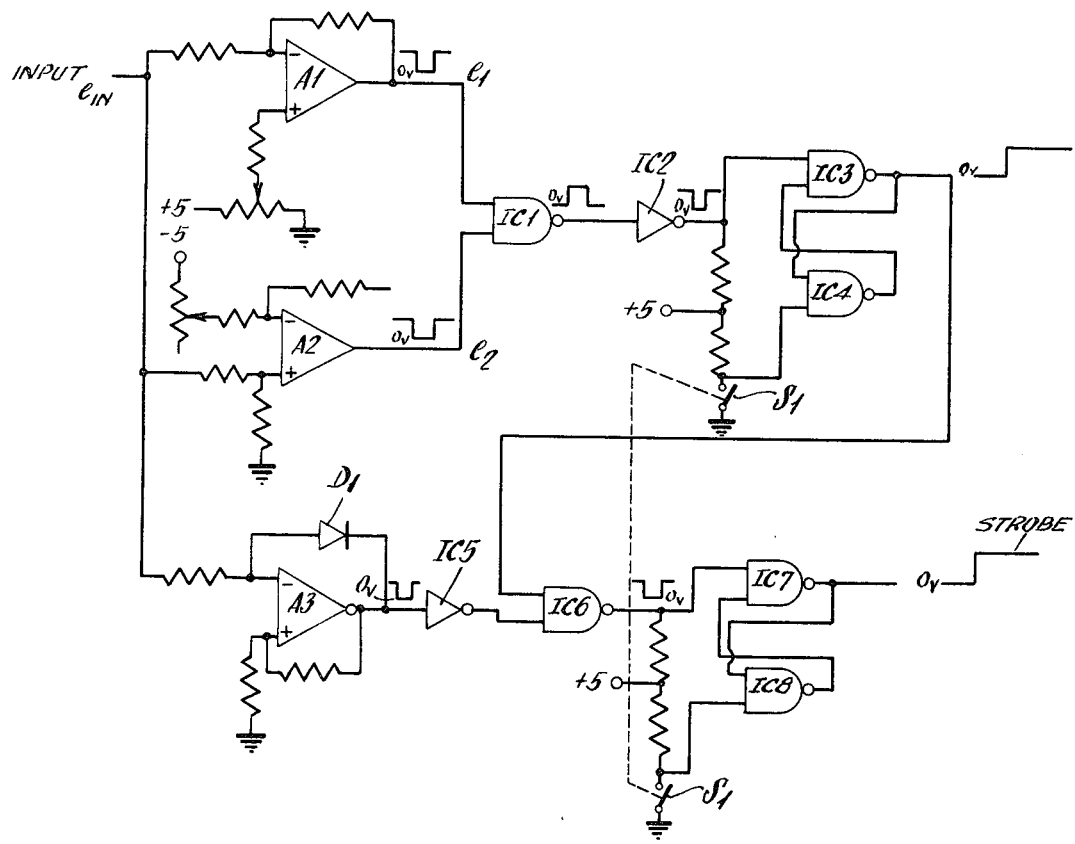
FIG. 7 is a schematic of the electronics for the zero crossover circuit (of FIG. 5) in accordance with the present invention.
Figure 7A:
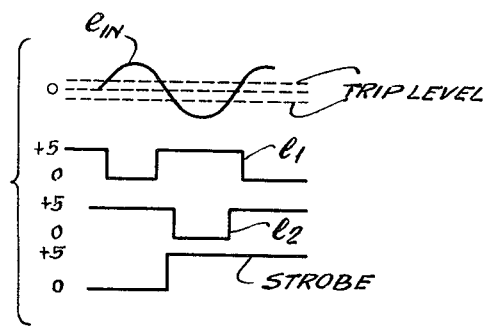
FIG. 7a illustrates certain wave forms produced as indicated in the electronic circuit of FIG. 7.

While the particular type of readout measurement system of FIG. 4 has been shown and described, other readout systems can also be used with the plenum chamber length transducer of this invention. For example, a conventional null meter can be used to determine when the position of the plenum spring end is centrally located in the eddy current coil and obtain the zero crossover point reading which comprises a zero reading on the meter. Output from the displacement sensed by transducer 36 is displayed on a conventional digital voltmeter 48 as shown in FIGS. 1 and 5. By relatively minor adjustments, the digital voltmeter output can be directly displayed in appropriate units and with a very high degree of accuracy. In FIG. 5, there is shown a fully automated plenum chamber length measurement system, the details of which will now be described. In this arrangement, the plenum chamber length transducer readout includes a zero crossover circuit 54 connected to the output of the eddy current electronics 46 for detecting the zero crossover point of the eddy current coil 24. This crossover circuit causes the digital voltmeter to sample and then strobes, that is, display the value of the input signal until the switch, 52, is depressed, enabling the system to make a new measurement. The details of the crossover circuit are shown in FIG. 7. The amplifiers A1 and A2 are used as level discriminators and their output remains at a +5 volts unless the input level of $e_1$ exceeds the trip threshold which is typically set for +0.5 volts in the case of A1 and −0.5 volts for A2. When the output of either A1 or A2 (which are integrated circuits, type SN 72,741) goes to 0.0 volts, the outputs are shown as $e_1$ and $e_2$, respectively, and the output of IC1 goes high, that is, has a maximum output signal. The circuit of IC3 and IC4 comprise a conventional set-reset flip-flop circuit. At the same time the IC1 goes high, the inverter circuit IC2 (which is SN 7,416 connected to IC1 goes low which causes the output of IC3 to set high in the set-reset flip-flop circuit (that is, the output of IC3 will remain high until switch 51 is depressed at which time the output of IC3 will go low and the output of IC4 will go high. This high state output of IC3 in turn enables the nand gate IC6 which is connected to the output of amplifier A3 through the inverter circuit IC5 (which is SN 7,416). The amplifier A3 is used to detect the zero crossover point of the input signal, $e_1$, that is the output of A3 goes low whenever the input level of $e_1$ is equal to or less than 0 volts. If IC6 is enabled either by amplifier A1 or A2, then the output of circuit IC7 which is part of a set-reset flip-flop comprised of IC7 and IC8 will be set high at the zero crossover point of $e_1$, thus providing an appropriate strobe signal to the digital voltmeter 48. This will result in an appropriate readout which will permit the plenum chamber length to be readily determined. The reset switch designated S1, resets the two set-reset flip-flops which are comprised of IC3 and IC4, and also IC7 and IC8, thus making the circuit ready to detect the next zero crossover point that occurs after the input level $e_1$ has exceeded a predetermined magnitude. The level detectors comprised of A1 and A2 prevent the zero crossover circuit from triggering on low level noise signals by making sure that only those signals above a certain level will be detected since it is known that the majority of noise signals will not exceed the predetermined level. IC1, IC3, IC4, IC6, IC7 and IC8 are integrated circuits type SN 7,400, which are all per se conventional and readily obtainable from Texas Instruments Inc. and several other vendors of integrated circuits.

FIG. 6 is a block diagram of the plenum chamber length transducer system using a linear potentiometer 56 instead of a LVDT 36. Essentially the overall operation of the system remains the same with mere substitution of the potentiometer for the transformer. The constant current power supply 58 supplies a constant current to the linear potentiometer which consists of a fixed resistance that has a movable slider contacting the resistance, the output signal is taken from the slider and one end of the fixed resistor, the magnitude of the output signal varies linearly with the position of the slider and the magnitude is measured by the digital voltmeter. The previously described invention has been in connection with the measurement of fuel rods after they have been in service in the nuclear fuel reactor. In the case where the fuel rods are being inspected and measured prior to service in the fuel reactor, this is accomplished in the same manner as previously described only there is no need for use of the inspection basin. The plenum chamber length transducer manually may be placed over the end of the fuel rod and the measurement proceeds as described above without the need for any remote handling of the fuel rods. This also may be automated to some degree, if desired, by using the system shown in FIG. 5 and by mounting the LVDT 36 and eddy current coil 24 to a machine which automatically advances them over the end of the fuel rod.

While a preferred embodiment of the present invention has been described heretofore and illustrated herewith, various other modifications will be obvious to those skilled in the art once they have been made aware of the present disclosure. Accordingly, reference should be made to the following appended claims to determine the true scope and spirit of this invention.

What we claim is:

1. A system for use in measuring the length of the plenum chamber of a nuclear fuel rod including a plenum spring having a first end in contact with a fuel column, said system comprising casing means having mounted at one end thereof a transducer means having a displaceable plunger extending into said casing means for contact with said nuclear fuel rod when said rod is disposed in said casing, said transducer providing an output signal proportional to the displacement thereof by an adjacent end of said fuel rod, and coil means mounted within said casing means spaced from said one end a predetermined distance for receiving said fuel rod therein and adapted to produce an output signal when said first end of said plenum spring is centrally located in said coil.

2. The system of claim 1 wherein said casing means includes guide means for assisting the advancement of said fuel rod therethrough.

3. The system of claim 1 including electronic circuit means connected with said coil means such that when said first end of said plenum spring is centrally located within said coil, said electronic circuit means provides an output indicative of the location of said first end of said plenum spring.

4. The system of claim 3 wherein said electronic circuit means are operably connected with the displacement transducer means for providing an indication of the length of the said plenum chamber of said fuel rod when said coil means provides said output.

5. The system of claim 1 wherein the displacement transducer means comprises a linear variable differential transformer.

6. The system of claim 1 including electronic circuit means connected with said transducer means and said coil means, said circuit means including zero crossover circuit means for detecting a zero crossover point at which said first end of said plenum spring is substantially located centrally within said coil.

7. The system of claim 6 wherein said circuit means comprises level discriminator circuit means for being activated when the input thereof exceeds a predetermined level such that low level noise actuation thereof is avoided.

8. The system of claim 1 including first electronic circuit means connected to said transducer means for providing an output signal indicative of the distance between said plunger and the center of said coil means, and second electronic circuit means connected to said coil means for providing an output signal which is a function of the reactance thereof.

9. The system of claim 8 including recorder means for recording the output traces of said first and second electronic circuit means, whereby when said first end of said plenum spring is centrally located in said coil means said output from said coil means comprises a zero crossover point and which the corresponding output from said first electronic circuit means is indicative of the length between said plunger and the center of said coil means.

10. The system of claim 9 including zero crossover circuit means for providing an output signal at said zero crossover point, and digital output means for receiving said output signal and providing a digital readout of said length.

11. The system of claim 1 in combination with an inspection basin having a liquid therein for receiving fuel rods therein after they have been in-service in a nuclear fuel reactor, wherein said casing means and said fuel rod are located beneath the surface of said liquid, and including first means operatively connected with said fuel rod for facilitating manipulation thereof, and second means operatively connected with said casing means for facilitating manipulation thereof for alignment with said fuel rod so that said rod can be properly advanced into said casing means for contact with said plunger.

12. The system of claim 11 wherein said first and second means extend out of said liquid for enabling manipulation of said fuel rod and said casing means.

* * * * *